UNITED STATES PATENT OFFICE.

ROBERT PRENDERGAST, OF SYDNEY, NEW SOUTH WALES, AND ROBERT FREE, OF MISTLEY, COUNTY OF ESSEX, ENGLAND.

COMPRESSED MALT.

SPECIFICATION forming part of Letters Patent No. 234,428, dated November 16, 1880.

Application filed May 31, 1880. (No specimens.) Patented in England October 27, 1879.

*To all whom it may concern:*

Be it known that we, ROBERT PRENDERGAST, a subject of the Queen of Great Britain, and of Castlemaine Brewery, Sydney, in the colony of New South Wales, but at present of 23 Southampton Buildings, in the county of Middlesex, England, and ROBERT FREE, also a subject of the Queen of Great Britain, residing at Mistley, in the county of Essex, also in England, have invented certain new and useful Improvements in the Treatment of Malt to Facilitate its Transportation and Preserve it in Good Condition, (for which we have made application for provisional protection in England, bearing date the 27th day of October, 1879, No. 4,372;) and we do hereby declare that the following is a full, clear, and exact description of the invention, which will enable others skilled in the art to which it appertains to make and use the same.

This invention has for its object improvements in the treatment of malt to facilitate its transportation and preserve it in good condition.

Heretofore when malt has been transported by sea or on land, or when it has been stored, it has been usual to pack or store the same loosely, either in sacks or in bulk, by which means the malt has been liable to great deterioration in consequence of its liability to absorb moisture, while it is very bulky and consequently costly to transport.

The object of our present invention is to obviate these difficulties. For this purpose we take malt, preferably immediately after it is manufactured and cooled. We then crush it by passing it through ordinary malt-crushing rollers, after which we compress it in a hydraulic or other press to preferably a third or less of its original bulk. The compression may be effected in bags, sacks, or other coverings or cases, which may afterward have their mouths closed, or the malt may be first compressed and then packed.

We also prefer to employ bags, sacks, or other coverings or cases which shall effectually exclude the air from contact with the malt, although ordinary bags or sacks may be employed, as when compressed, even if the air did obtain access to the malt, it would affect it only to a slight extent, as the action of the air could not affect the malt far beyond the outer surface.

In carrying our invention into effect we prefer to place the required quantity of crushed malt to be compressed in a chamber or mold of the desired shape, in which the follower of a press is caused to act upon the malt to compress it to the required bulk. The compressed malt is then discharged from the compression-chamber or mold and placed in suitable bags, cases, or boxes.

If desired, in order to facilitate the cohesion or agglomeration of the malt, a small proportion of saccharine matter—such, for instance, as cane-sugar and glucose or dextrine or other suitable gummy or adhesive substance—may be mixed with the malt, in which case the crushing of the malt previous to compressing the same may be dispensed with.

We are aware that it has already been contemplated to moisten tooth-powder and then press the same into molds, also to granulate coffee, then coat the same with a gelatinous substance, and by the aid of humid heat press such coffee into molds; and we are also aware that bran has been moistened and then compressed; but we are not aware that it has ever been contemplated to crush and then compress malt without the application thereto of moist heat, as described by us. The application to the malt of moist heat would be quite objectionable.

By our process not only is the bulk of a given quantity of malt lessened and the costs of storage and transportation decreased, but the full flavor of the malt is preserved and the deterioration usually consequent on transporting it from place to place avoided.

Another advantage gained by the present process is that the crushing of the malt by the users prior to its use by them is dispensed with, the article as purchased being ready for immediate use, thereby avoiding much of the trouble at present experienced by brewers where they have to crush the malt themselves.

Having thus described the nature of the said invention and the mode in which the same may be carried into effect, we would have it understood that what we claim is—

As a new article of manufacture, a crushed and compressed coherent mass or block of malt, substantially as set forth.

ROBERT PRENDERGAST.
ROBERT FREE.

Witnesses:
 B. J. B. MILLS,
 C. M. WHITE,
Both of 23 Southampton Buildings, London, England.